(12) United States Patent
Schenker et al.

(10) Patent No.: US 11,982,391 B2
(45) Date of Patent: May 14, 2024

(54) PERCUSSIVE PRESSURE DAMPER

(71) Applicants: David Paul Schenker, Garden City, ID (US); Patrick Edwin Johnston, Boise, ID (US)

(72) Inventors: David Paul Schenker, Garden City, ID (US); Patrick Edwin Johnston, Boise, ID (US)

(73) Assignee: Versus LLC, Garden City, ID (US)

( * ) Notice: Subject to any disclaimer, the term of this patent is extended or adjusted under 35 U.S.C. 154(b) by 0 days.

(21) Appl. No.: 17/576,891

(22) Filed: Jan. 14, 2022

(65) Prior Publication Data

US 2022/0290790 A1 Sep. 15, 2022

Related U.S. Application Data

(60) Provisional application No. 63/137,701, filed on Jan. 14, 2021.

(51) Int. Cl.
*F16L 55/027* (2006.01)

(52) U.S. Cl.
CPC .............................. *F16L 55/02718* (2013.01)

(58) Field of Classification Search
CPC ........... F02M 35/1216; F16L 55/02718; F16L 55/02727; F16L 55/02781; F16L 55/0331; Y10T 428/24165
USPC ........ 89/14.3, 14.4; 181/223, 247, 249, 276, 181/288, 293
See application file for complete search history.

(56) References Cited

U.S. PATENT DOCUMENTS

| | | | | |
|---|---|---|---|---|
| 3,178,335 A * | 4/1965 | Karker | ................ | B31D 3/0207 |
| | | | | 428/118 |
| 5,333,529 A * | 8/1994 | Brockman | .............. | F41A 21/38 |
| | | | | 89/14.3 |
| 6,227,252 B1 * | 5/2001 | Logan | ....................... | F16L 9/04 |
| | | | | 138/148 |
| 6,617,002 B2 * | 9/2003 | Wood | ..................... | G10K 11/16 |
| | | | | 428/137 |
| 7,497,301 B2 * | 3/2009 | Cheng | ................ | F02M 35/1255 |
| | | | | 181/248 |
| 11,435,156 B1 * | 9/2022 | Dellinger | ............. | G10K 11/165 |

(Continued)

FOREIGN PATENT DOCUMENTS

DE 10226047 A1 * 12/2003 ............. F41A 21/30
WO WO-2019203777 A1 * 10/2019

*Primary Examiner* — David R Deal
(74) *Attorney, Agent, or Firm* — Burdick Patents, P.A.; Sean D. Burdick

(57) ABSTRACT

A percussive pressure damper includes an entrance port, an exit port axially displaced from the entrance port, an axial flow channel extending from the entrance port to the exit port, a plurality of expansion chambers each extending radially from and in fluid communication with the axial flow channel, and an outer wall enclosing the axial flow channel and the expansion chambers. Each expansion chamber is enclosed by an inner surface of the outer wall and by interior walls, such that any cross section of the tube normal to the axial flow channel cuts through at least one interior wall between the axial flow channel and the outer wall. The expansion chambers may form a generally cylindrical honeycomb structure, each enclosing a hexagonal conical volume that expands in a radial direction, the expansion chambers axially stacked in radially symmetric and axially offset groups.

17 Claims, 5 Drawing Sheets

(56) References Cited

U.S. PATENT DOCUMENTS

| | | | |
|---|---|---|---|
| 2016/0018178 A1* | 1/2016 | Johansen | F41A 21/30 |
| | | | 181/223 |
| 2017/0328666 A1* | 11/2017 | Liskey | F41A 21/30 |
| 2018/0306543 A1* | 10/2018 | Tertin | F41A 21/325 |
| 2020/0284541 A1* | 9/2020 | Poling | F41A 21/30 |
| 2021/0207916 A1* | 7/2021 | Belykov | F41A 21/30 |

* cited by examiner

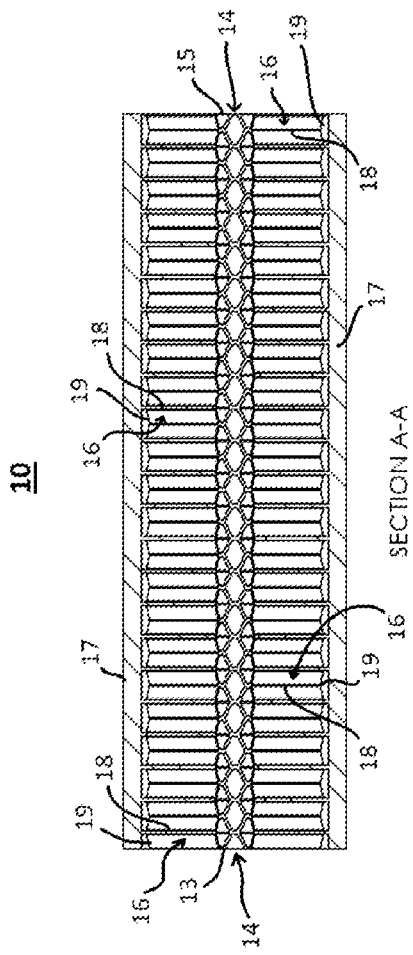
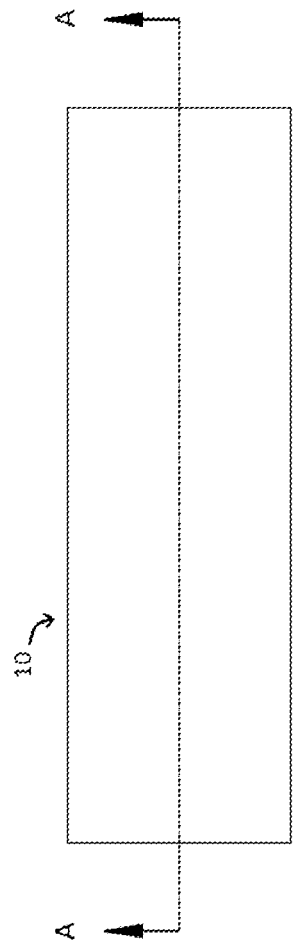
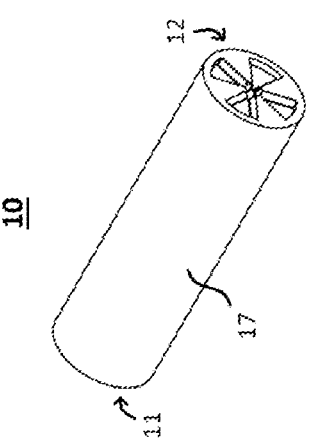
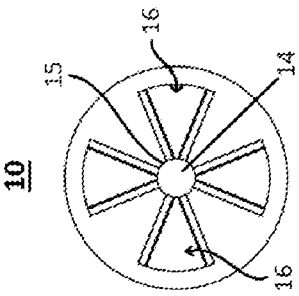

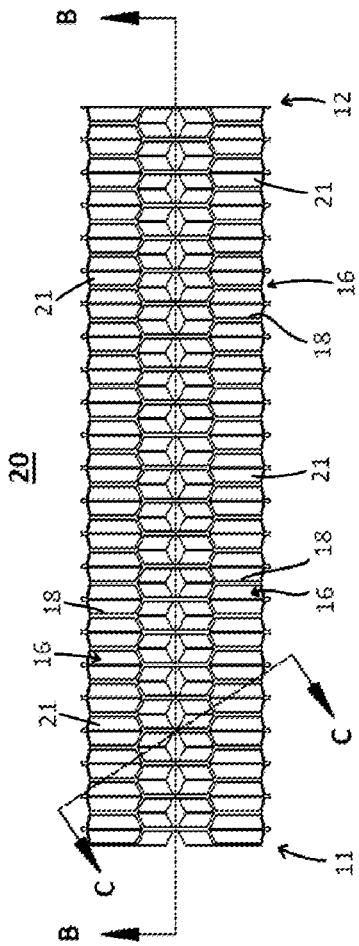
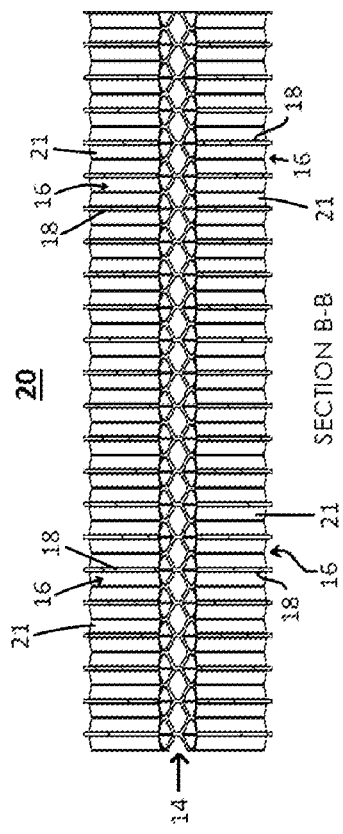
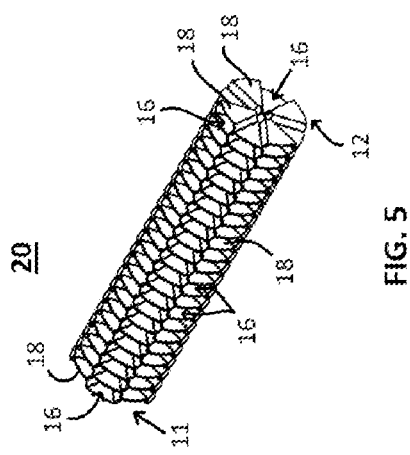
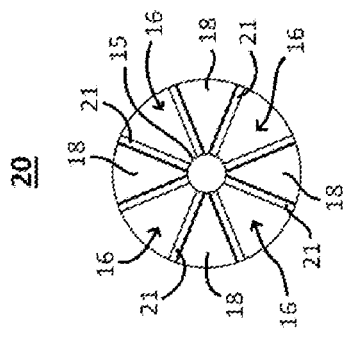

SECTION D-D

PERCUSSIVE PRESSURE DAMPER

RELATED APPLICATIONS

This application claims priority to U.S. Provisional Application 63/137,701 that was filed on Jan. 14, 2021 and which is fully incorporated herein by reference.

BACKGROUND OF THE INVENTION

Field of the Invention

The present invention relates generally to fluid pressure damping systems, more specifically to sound suppression systems, and most specifically to suppressors for firearms.

Description of Related Art

There are various applications for fluid pressure damping systems, such as mufflers for automobile exhaust, pulsation dampeners for fluid flow, and suppressors (silencers) for firearms. Suppressors for firearms are configured for attachment to the muzzle end of the firearm to effectively extend the length of the channel through which exhaust gas must travel as it propels a projectile load. A baffle structure within the suppressor slows and expands the volume of exhaust gas, which muffles the sound created by the percussive effect of pressurized gas exiting the gun barrel.

Most suppressors, like the gun barrels they attach to, are usually cylindrical and tubular. In general, the larger the tube, the more volume there is for gas expansion and baffling and the greater the potential for sound suppression. On the other hand, the suppressor should add as little mass as possible to the firearm, to minimize adverse effects on handling the weapon.

Hoop stress—the force exerted circumferentially (i.e. perpendicular to both the axis and the radius, in both directions on every particle in the cylinder wall)—is another limiting factor in suppressor design. Where the cylinder wall thickness is no greater than one-tenth of its radius, the hoop stress HS is given by $HS=(P)(r)/t$ where P is the internal pressure, t is the wall thickness, and r is the mean radius of the cylinder. Thus, as the radius increases, the hoop stress increases, making the cylinder wall more prone to failure. The hoop stress can be diminished by increasing the thickness of the cylinder wall, but this adds to suppressor weight and cost of construction. Alternatively, the suppressor tube can be lengthened to allow for additional baffling structure; however, as the length of the tube increases, the center of mass of the firearm advances further away from the marksman's grip, making the firearm more unwieldy.

What is needed is an advancement in pressure damper design that is resistant to hoop stress to enable lightweight construction of an effective damper.

SUMMARY OF THE INVENTION

The present invention provides an engineered design for a percussive pressure damper that reduces the weight-to-length ratio of a suppressor without increasing the risk of hoop stress failure or sacrificing sound attenuation. Generally speaking, the invention provides an internal baffle structure for a pressure tube consisting of axially stacked expansion chambers within a tubular outer wall that surround an axial flow channel, arranged so that no cross section of the tube normal to the axial flow channel cuts through only the outer wall and the axial flow channel.

In a basic embodiment, a fluid pressure damper according to the invention includes a tube having an entrance port, an exit port axially displaced from the entrance port, an axial flow channel extending from the entrance port to the exit port, a plurality of expansion chambers each extending radially from and in fluid communication with the axial flow channel, and an outer wall enclosing the axial flow channel and the expansion chambers. Each expansion chamber may be enclosed by an inner surface of the outer wall and by at least one interior wall, such that any cross section of the tube normal to the axial flow channel between the entrance port and the exit port cuts through the at least one interior wall from the axial flow channel to the inner surface of the outer wall.

Many variations on the basic embodiment are possible within the scope of the invention. For example, the aforedescribed fluid pressure damper maybe configured so that the axial flow channel extends along a straight path or along a curved path from the exit port to the entrance port. The fluid pressure damper may be generally cylindrical, or non-cylindrical. The axial flow channel may have a substantially constant diameter, which may substantially match a bore size of a firearm.

Further illustrated herein are embodiments of the aforedescribed fluid pressure damper wherein the expansion chambers collectively comprise a generally cylindrical structure wherein each expansion chamber has a specialized geometry. For example, the specialized geometry may consist of nested expansion chambers wherein adjacent chambers share common interior walls, or wherein expansion chambers have interlocking hexagonal borders arranged in a honeycomb pattern. In one variation, one or more of the expansion chambers encloses a volume that increases in a radial direction from the axial flow channel to the outer wall. In another variation, one or more of the expansion chambers forms a curved hexagonal boundary with the axial flow chamber. In other variations, one or more of the expansion chambers may form a curved hexagonal boundary with the outer wall, may include four interior planar walls, may include a hexagonal conical volume, or may compose expansion chambers that are substantially identical in form.

Another illustrated embodiment of the aforedescribed fluid pressure damper features a plurality of expansion chambers that include one or more groups of axially stacked expansion chambers. Each group of axially stacked expansion chambers may occupy one of a plurality of sectors of the tube, wherein the sectors surround the axial flow channel. In one embodiment, the sectors have substantially identical volumes. In another embodiment, with respect to the axial flow channel, each sector may be displaced from an adjacent sector by a common angular offset. In another embodiment, at least one pair of adjacent groups of axially stacked expansion chambers are axially offset. According to the invention, variations of the aforedescribed embodiments reduce hoop stress in the pressure damper tube by arranging at least one group of axially stacked expansion chambers so that no cross section of the tube normal to the axial flow channel between the entrance port and the exit port cuts through only the outer wall and the axial flow channel.

Still other variations on the invention are illustrated herein. For example, a fluid pressure damper according to the invention further includes a group of axially stacked expansion chambers, each expansion chamber including a plurality of interior walls, wherein each interior wall has a wall thickness that separates an adjacent pair of the axially stacked expansion chambers. The plurality of interior walls may have a common wall thickness, or may define a plurality of wall thicknesses, or the wall thickness of the interior walls may vary according to axial distance from the entrance port. Any embodiment of a pressure damper illustrated herein may feature an outer wall having one or more heat sinking elements.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 1 is a perspective view of one embodiment according to the invention for a percussive pressure damper.

FIG. 2 is an exit end view of the pressure damper of FIG. 1.

FIG. 3 is a side view of the pressure damper of FIG. 1.

FIG. 4 is a cross sectional side view of the pressure damper of FIG. 1 taken along section line A-A of FIG. 3.

FIG. 5 is a perspective view of the internal baffle structure of the pressure damper of FIG. 1.

FIG. 6 is an exit end view of the internal baffle structure of FIG. 5.

FIG. 7 is a side view of the internal baffle structure of FIG. 5.

FIG. 8 is a cross sectional side view of the internal baffle structure of FIG. 5 taken along section line B-B of FIG. 7.

DETAILED DESCRIPTION OF THE INVENTION

Figure 10:
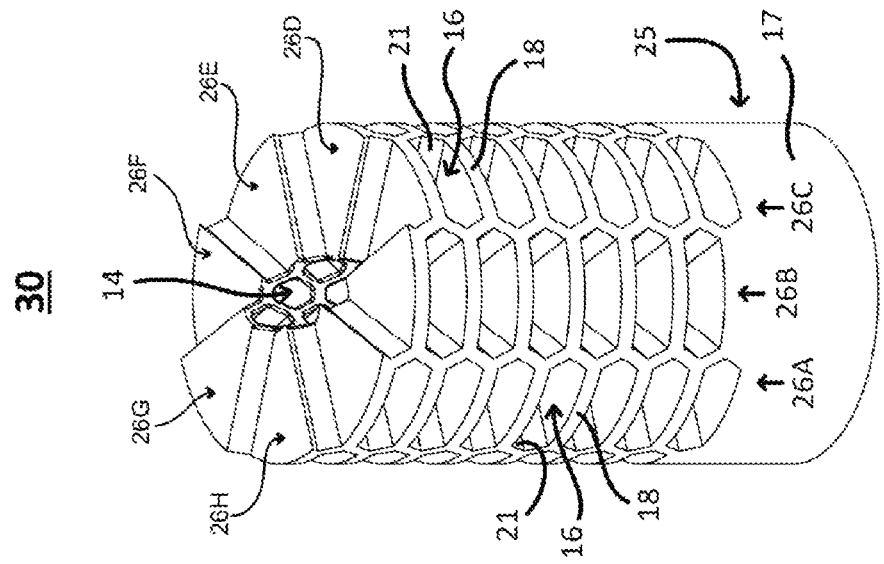
FIG. 10 shows a partially cut away perspective view of an embodiment of an internal baffle structure for a percussive pressure damper according to the invention, with the outer wall not shown.

The following disclosure presents exemplary embodiments for a percussive pressure damper that reduces the weight-to-length ratio of a suppressor without increasing the risk of hoop stress failure or sacrificing sound attenuation. Generally speaking, the invention provides an internal baffle structure for a pressure tube consisting of axially stacked expansion chambers within a tubular outer wall that surround an axial flow channel. The expansion chambers are arranged so that no cross section of the tube normal to the axial flow channel cuts through only the outer wall and the axial flow channel. In other words, the internal baffle is structured to define the expansion chambers for combustion gases and also enhance the thickness of the outer wall of the tube at every location along the axial length of the pressure damper.

FIG. 1 shows a perspective view of one embodiment according to the invention for a percussive pressure damper 10. The pressure damper 10 may be generally cylindrical, as shown, through other geometries are possible within the scope of the invention. An axial flow channel 14 runs longitudinally through the pressure damper 10, from an entrance port 13 at the entrance end 11 to an exit port 15 at the exit end 12. The entrance port 13 is axially displaced from the exit port 15. In one embodiment, the axial flow channel 14 runs in a straight path from the entrance port 13 to the exit port 15. In other embodiments, the axial flow channel 14 may run along a curved path or other non-straight path from entrance port 13 to exit port 15. Herein, axially displaced means displacement in the axial direction, i.e. in a direction along or parallel to the longitudinal axis of the pressure damper, whether the axial flow channel 14 runs in a straight path or a non-straight path. In one embodiment, the pressure damper 10 is a singular rigid component. It may be manufactured, for example, by casting, injection molding, or three-dimensional printing, using a metal, thermoplastic, polymer, or composite material that is suitable for use according to those manufacturing methods.

FIG. 2 shows an exit end view of the pressure damper 10. In this view, the exit port 15 is formed substantially at the radial center of the damper 10. A plurality of expansion chambers 16 each extend radially from the axial flow channel 14 and are in fluid communication therewith. An outer wall 17 encloses the axial flow channel 14 and the expansion chambers 16. In one embodiment of the invention, a pressure damper 10 may include one or more heat sinking elements such as fins (not shown) formed on the outer wall 17.

FIG. 3 shows a side view of the pressure damper 10, and FIG. 4 shows a cross sectional side view of pressure damper 10 taken along section line A-A of FIG. 3. In this embodiment, the axial flow channel 14 extends along a straight path from the entrance port 13 to the exit port 15. Other embodiments of the invention are possible wherein the axial flow channel 14 extends from entrance port 13 to exit port 15 along a non-straight path. Axial flow channel 14 is also shown having a substantially constant diameter along its entire path, the diameter being substantially equivalent to the diameter of the entrance port 13 and to that of the exit port 15. In one embodiment, wherein the pressure damper serves as a firearm suppressor, the diameter of the axial flow channel 14 substantially matches the bore size of the firearm.

As shown in FIG. 4, each expansion chamber 16 is enclosed by an inner surface 19 of the outer wall 17, and by at least one interior wall 18. An interior wall 18 is any part of the structure of the pressure damper that occupies an intermediate position between an inner surface 19 of the outer wall 17 and the outer diameter of the axial flow channel 14. Such a structure is configured to ensure that any cross section of the pressure damper 10 normal to the axial flow channel 14 between the entrance port 13 and the exit port 15 cuts through at least one interior wall 18 that lies between the axial flow channel 14 and the inner surface 19 of the outer wall 17.

FIG. 5 shows a perspective view of the internal baffle structure 20 of pressure damper 10. The internal baffle structure 20 defines the expansion chambers 16 and also provides interior walls 18 to enhance the thickness of and provide structural support for the outer wall 17 at every location along the axial length of the pressure damper. As shown in this figure, the plurality of expansion chambers 16 forms a structure of nested or interlocking hexagonal chambers. In one embodiment, the interlocking hexagonal expansion chambers form a honeycomb structure. The overall shape of the structure of the expansion chambers 16 substantially matches, and is entirely enclosed by the outer wall 17. In this particular embodiment of an internal baffle structure 20, all of the expansion chambers 16 are substantially identical in form.

FIG. 6 is an exit end view of the internal baffle structure 20. In this view, there are eight wedge-shaped expansion chambers 16 arranged in radial symmetry about the exit port 15. Each expansion chamber 16 is axially offset from adjacent expansion chambers 16. As shown in this embodiment, the axial offset between any two adjacent expansion chambers 16 is about half of the axial thickness of any expansion chamber 16. Thus, each wedge-shaped area labeled 18 indicates an interior wall 18 that is flush with the exit end 12, and each wedge-shaped area labeled 16 indicates an expansion chamber 16 that has its volume exposed to the viewer. Interior walls 21 lie between each pair of interior walls 18 that enclose an expansion chamber 16. That is, each expansion chamber 16 is enclosed by a plurality of interior walls 18 and 21. In the embodiment shown, each expansion chamber 16 is enclosed by two interior walls 18 and by two interior walls 21. In these embodiments, each interior wall 18, 21 may be planar, or one or more of the interior walls 18, 21 may be planar or slightly curved.

Figure 9:
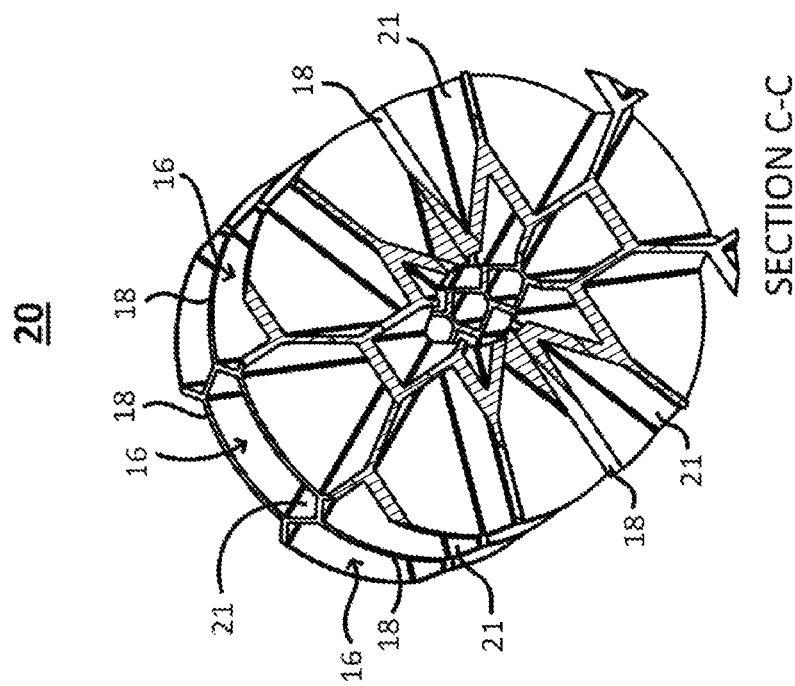
FIG. 9 is a magnified perspective view of the internal baffle structure of FIG. 5 taken along section line C-C of FIG. 7.

FIG. 7 shows a side view of the internal baffle structure 20. This view provides further illustration of a regular arrangement of substantially identical axially offset expansion chambers 16, which in this embodiment resemble a honeycomb structure. FIG. 8 shows a cross sectional side view of the internal baffle structure 20 taken along section line B-B of FIG. 7. Axial flow channel 14 extends along a straight path from entrance to exit. FIG. 9 shows a magnified perspective view of the internal baffle structure 20 taken along section line C-C of FIG. 7, to further illustrate the geometry.

FIG. 10 shows a partially cut away perspective view of an embodiment of an internal baffle structure 30 for a percussive pressure damper according to the invention. The honeycomb pattern in this embodiment is similar to that described above. In addition, structure 30 includes a solid end portion 25 that is devoid of expansion chambers. In other embodiments of the invention, end portion 25 may occur at either or both of the entrance end and the exit end of the pressure damper. The top end of the figure is partially cut away, and the outer wall 17 is not shown, to better illustrate the configuration of the internal baffle structure 30. As shown, one or more of the expansion chambers 16 enclose a volume that increases in a radial direction from the axial flow channel 14 to the outer wall 17. In one embodiment, the volume of the expansion chamber 16 has the general configuration of a hexagonal cone.

In particular, internal baffle structure 30 illustrates a configuration of expansion chambers 16 that are arranged as a plurality of axially stacked groups of expansion chambers. There are eight such axially stacked groups, and the groups are arranged for radial symmetry about the axial flow channel 14. Thus, each of the eight groups occupies one of eight axial sectors. Other embodiments of the invention may include greater or fewer than eight such sectors, and in different embodiments the sectors may have substantially identical volumes, or at lease two such sectors may have different volumes. In embodiments where the sectors have substantially identical volumes, each sector may be displaced from an adjacent sector by a common angular offset. For example, in FIG. 10, each sector is displaced from an adjacent sector by a common angular offset of 45 degrees. As shown in FIG. 10, three of the axially stacked groups of expansion chambers 16 are groups 26A, 26B and 26C, and each group occupies one axial sector. Group 26A is adjacent to group 26B; group 26B is adjacent to group 26A and to group 26C; and group 26C is adjacent to group 26B. Each adjacent pair of axially stacked groups of expansion chambers 16 are axially offset. In internal baffle structure 30, the axial offset is equivalent to half the axial length of an expansion chamber 16, where the axial length includes the space between the chamber's interior planar walls 18, and the thickness of one of the interior walls 18. In addition, each group of axially stacked expansion chambers 16 may include a plurality of interior walls 21 that separate an adjacent group of axially stacked expansion chambers 16. The amount of separation is determined by the thickness of each interior wall 21. In the embodiments illustrated herein, all interior walls 18, 21 have a common thickness. In other embodiments, the wall thicknesses may vary. The remaining five groups of the eight axial stacked expansion chambers 16 are groups 26D, 26E, 26F, 26G and 26H, each group shown as a vertical stack of expansion chambers, each stack occupying a 45-degrees of volumetric wedge of the cylindrical form of the internal baffle structure 30.

Figure 11:
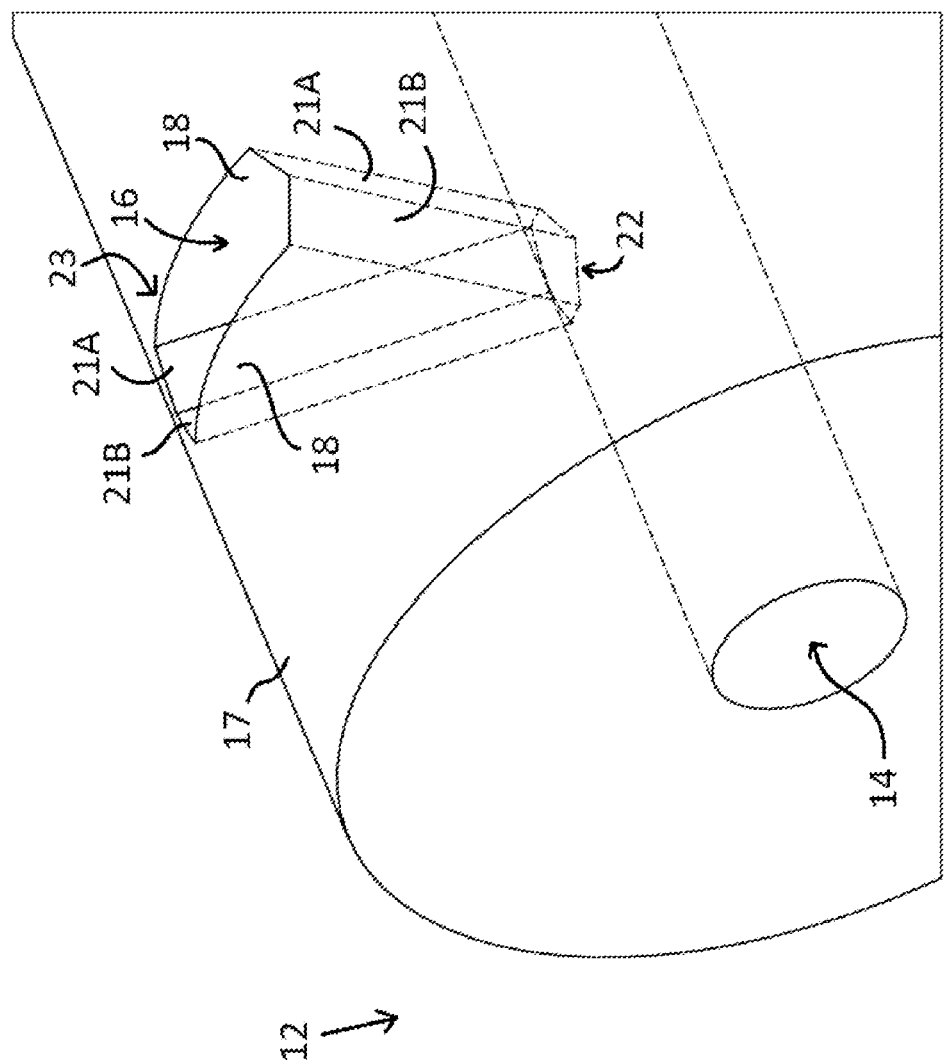
FIG. 11 is a magnified transparent cut away perspective view of an exit end of an embodiment according to the invention for an internal baffle structure, with the outer wall not shown.

FIG. 11 shows a magnified transparent cut away perspective view of an exit end of one embodiment according to the invention for an internal baffle structure. For purposes of illustration only, the internal baffle structure is simplified by showing a single expansion chamber 16 with the outer wall 17 not shown. Expansion chamber 16 has the general form of a hexagonal conical volume. The volume is enclosed on its sides by interior walls 18 and 21. Here, each interior wall 21 is divided into two interior walls 21A and 21B, to illustrate the geometric interface between any two adjacent expansion chambers 16 that are axially offset. Each interior wall 21A, 21B extends in a radial direction from the axial flow channel 14 to the inner surface 19 of the outer wall 17. The volume of the expansion chamber is enclosed at its furthest radial extent 23 by the inner surface 19 of outer wall 17, with which the expansion chamber 16 forms a curved hexagonal boundary. The volume is open at its boundary 22 with the axial flow channel 14. In the embodiment of FIG. 11, the expansion chamber 16 forms a curved hexagonal boundary with the axial flow channel 14. The geometric configuration of the interior walls 18, 21A, 21B may vary, as many different wall-to-wall angles and wall lengths are possible within the scope of the invention.

Figure 14:
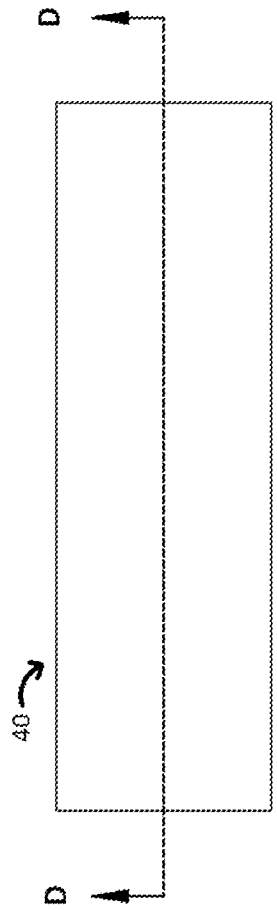
FIG. 14 is a side view of the pressure damper of FIG. 12.
Figure 12:
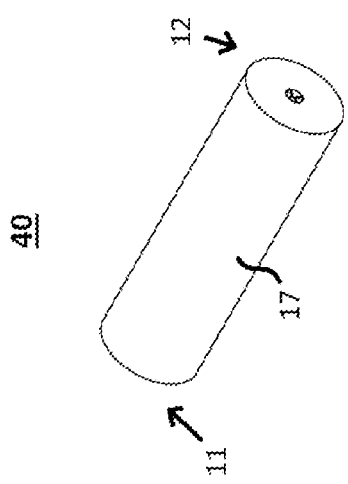
FIG. 12 is a perspective view of another embodiment according to the invention for a percussive pressure damper.
Figure 13:
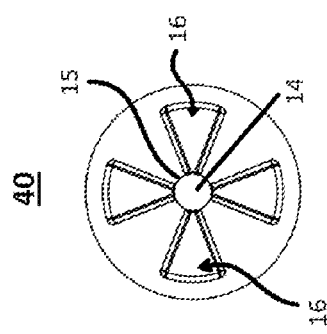
FIG. 13 is an exit end view of the pressure damper of FIG. 12.

FIG. 12 shows a perspective view of another embodiment according to the invention for a percussive pressure damper 40. FIG. 13 is an exit end view of pressure damper 40, and FIG. 14 is a side view of the pressure damper 40. The outer appearance and configuration of pressure damper 40 as shown in these figures is identical to that of pressure damper 10.

Figure 15:
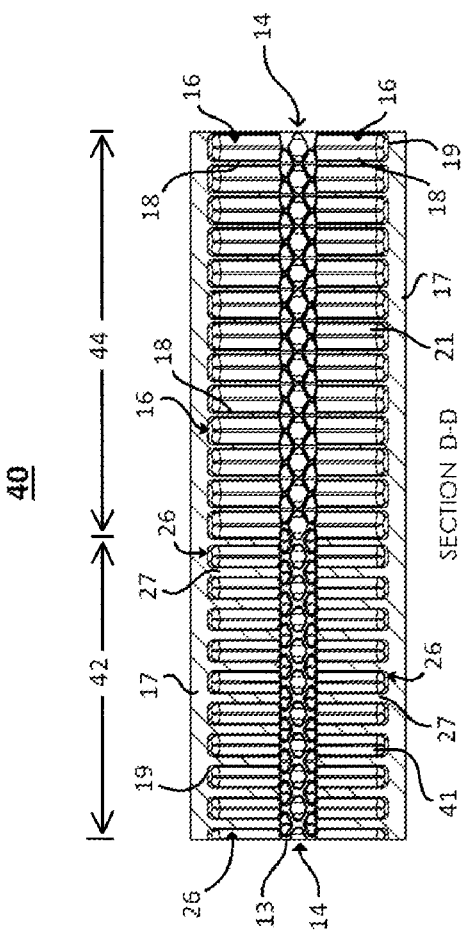
FIG. 15 is a cross sectional side view of the pressure damper of FIG. 12 taken along section line D-D of FIG. 14.

FIG. 15 shows a cross sectional side view of pressure damper 40 taken along section line D-D of FIG. 14. The internal baffle structure of pressure damper 40 differs from that shown in previously embodiments in that the size of the expansion chambers varies according to distance from the entrance port 13. Along a first portion 42 of the axial length of the pressure damper 40, a series of expansion chambers 26 are arranged according to structures and symmetries previously described. Along a second portion 44 of the axial length of the pressure damper 40, a series of expansion chambers 16 are arranged according to structures and symmetries previously described; however, throughout the second portion 44, the volume of each expansion chamber 16 differs from the volume of each expansion chamber 26. For pressure damper 40, the volume of an expansion chamber 26 is less than the volume of an expansion chamber 16. As a consequence, the interior walls 27 that separate adjacent expansion chambers 26 may have a greater thickness than that of interior walls 18. Similarly, the interior walls 41 that join to interior walls 27 in the first portion 42 may also have greater thickness than their counterpart interior walls 21 of the second portion 44. Such a configuration, where the expansion chamber volume or interior wall thickness (or both) varies according to axial distance from the entrance port, advantageously allows the designer to customize the damper for a particular application by providing greater resistance to hoop stress at locations along the pressure damper that experience the greatest forces from fluid pressure. Locations under less stress can then be designed with chamber volumes and wall thicknesses that otherwise optimize the design, in terms of manufacturing cost, overall length, overall weight, etc. Skilled artisans will recognize that various configurations of pressure dampers that have uniform or non-uniform distribution of expansion chambers and interior wall thicknesses are possible without departing from the principles of the invention.

In view of the geometry shown in the figures and described in the foregoing paragraphs, skilled artisans will recognize that according to the invention, one or more groups of axially stacked expansion chambers are arranged in a percussive pressure damper so that no cross section of the pressure damper normal to the axial flow channel between the entrance port and the exit port cuts through only the outer wall and the axial flow channel. In other words, there is no such cross section that results in a hollow circle of outer wall unsupported by interior structure. The outer wall must be supported by at least one interior wall or at every plane normal to the axis along a path in an axial direction from entrance end to exit end. Such configuration allows the pressure damper of the present invention to withstand greater hoop stress with less thickness in its outer wall, relative to wall thickness for the same hoop stress seen in conventional pressure dampers, and at the same time provide a plurality of expansion chambers that collectively allow sufficient space for expansion of high pressure gas and muffling of sound. Accordingly, in an application for a firearm silencer, the present invention advantageously provides an apparatus and method for a lighter weight suppressor without loss of sound attenuation.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fluid pressure damper, comprising:
   a tube having an entrance port, an exit port axially displaced from the entrance port, an axial flow channel extending from the entrance port to the exit port, a plurality of expansion chambers each extending radially from and in fluid communication with the axial flow channel, and an outer wall enclosing the axial flow channel and the expansion chambers;
   each expansion chamber enclosed by an inner surface of the outer wall and by a plurality of internal walls that each extend from the axial flow channel to the outer wall;
   wherein the outer wall is integrally formed to each of the inner walls; and
   wherein the expansion chambers comprise a plurality of groups of axially stacked expansion chambers, each group of axially stacked expansion chambers axially offset from and overlapping an adjacent one of the groups of axially stacked expansion chambers.

2. The fluid pressure damper of claim 1 wherein the axial flow channel extends along a straight path from the exit port to the entrance port.

3. The fluid pressure damper of claim 1 wherein each expansion chamber is enclosed by an inner surface of the outer wall and by at least one interior wall, and wherein any cross section of the tube normal to the axial flow channel between the entrance port and the exit port cuts through the at least one interior wall of any expansion chamber between the axial flow channel and the inner surface of the outer wall.

4. The fluid pressure damper of claim 1 wherein the tube is generally cylindrical.

5. The fluid pressure damper of claim 1 wherein the axial flow channel has a substantially constant diameter.

6. The fluid pressure damper of claim 5 wherein the diameter matches a standard bore size of a firearm.

7. The fluid pressure damper of claim 1 wherein the plurality of expansion chambers comprises interlocking expansion chambers each having at least one hexagonal boundary.

8. The fluid pressure damper of claim 7 wherein the interlocking expansion chambers form a generally cylindrical honeycomb structure.

9. The fluid pressure damper of claim 1 wherein at least one of the expansion chambers encloses a volume that increases in a radial direction from the axial flow channel to the outer wall.

10. The fluid pressure damper of claim 1 wherein at least one of the expansion chambers forms a curved hexagonal boundary with the axial flow chamber.

11. The fluid pressure damper of claim 1 wherein at least one of the expansion chambers forms a curved hexagonal boundary with the outer wall.

12. The fluid pressure damper of claim 1 wherein at least one of the expansion chambers is enclosed by two or more interior planar walls.

13. The fluid pressure damper of claim 1 wherein at least one of the expansion chambers comprises a hexagonal conical volume.

14. The fluid pressure damper of claim 1 wherein the expansion chambers are substantially identical in form.

15. The fluid pressure damper of claim 1 wherein the plurality of expansion chambers comprises at least one group of axially stacked expansion chambers.

16. The fluid pressure damper of claim 15 wherein the at least one group of axially stacked expansion chambers are arranged so that no cross section of the tube normal to the axial flow channel between the entrance port and the exit port cuts through only the outer wall and the axial flow channel.

17. The fluid pressure damper of claim 1 wherein each group of axially stacked expansion chambers occupies one of a plurality of sectors of the tube, the sectors surrounding the axial flow channel.

\* \* \* \* \*